United States Patent
Decker

[11] Patent Number: 6,015,194
[45] Date of Patent: Jan. 18, 2000

[54] METHOD AND ARRANGEMENT FOR CONTROLLING A BRAKING SYSTEM OF A VEHICLE

[75] Inventor: Heinz Decker, Vaihingen, Germany

[73] Assignee: Robert Bosch GmbH, Stuttgart, Germany

[21] Appl. No.: 08/941,047

[22] Filed: Sep. 30, 1997

[30] Foreign Application Priority Data

Oct. 1, 1996 [DE] Germany ............................ 196 40 533
Nov. 21, 1996 [DE] Germany ............................ 196 48 195

[51] Int. Cl.[7] .................................................... B60T 13/66

[52] U.S. Cl. ............................................. 303/155; 303/20

[58] Field of Search ................................ 303/20, 89, 155, 303/176; 188/161, 162; 701/93

[56] References Cited

U.S. PATENT DOCUMENTS

| | | | |
|---|---|---|---|
| 4,550,372 | 10/1985 | Kahrs | 303/152 |
| 5,415,467 | 5/1995 | Utz et al. | 303/89 |
| 5,774,820 | 6/1998 | Linden et al. | 701/93 |
| 5,806,938 | 9/1998 | Stumpe et al. | 303/155 |

FOREIGN PATENT DOCUMENTS

WO 94/24453  10/1994  WIPO .

*Primary Examiner*—Robert J. Oberleitner
*Assistant Examiner*—Mariano Sy
*Attorney, Agent, or Firm*—Walter Ottesen

[57] ABSTRACT

The invention is directed to a method and an arrangement for controlling a brake system wherein the electrically actuable actuator for the wheel brakes is actuated in the context of a closed-loop control in normal operation. A transfer from the closed-loop control to an open-loop control of the actuator takes place with entry into at least one pregiven operating state, especially an operating state with low wheel rpm.

14 Claims, 5 Drawing Sheets

# METHOD AND ARRANGEMENT FOR CONTROLLING A BRAKING SYSTEM OF A VEHICLE

FIELD OF THE INVENTION

The invention relates to a method and an arrangement for controlling a brake system of a motor vehicle such as a brake system having an electric braking force.

BACKGROUND OF THE INVENTION

A braking system with electrical braking force for motor vehicles is disclosed, for example, in international patent publication WO-A 94/24453. There, a brake system is described wherein the braking force is generated by electric motors. A suitable procedure for actuating these wheel brakes, especially in the region of standstill of the vehicle, is not suggested herein.

SUMMARY OF THE INVENTION

It is an object of the invention to provide measures for actuating wheel brakes of a vehicle especially in the region of the standstill of the vehicle.

The method of the invention is for controlling a brake system of a motor vehicle driven by an operator, the brake system including at least one wheel brake apparatus including an actuable brake actuator. The method includes the steps of: actuating the brake actuator in the context of a closed-loop control in dependence upon a desired value pregiven by the operator; and, switching from the closed-loop control to an open-loop control of the brake actuator in at least one operating region of the vehicle in dependence upon the desired value.

The solution provided by the invention makes a suitable procedure for actuating the wheel brakes available and is especially suited for the region of standstill of the vehicle. This procedure affords special advantages when actuating the wheel brakes in the context of a brake torque control loop.

It is furthermore advantageous to provide a clear strategy for the service brake and/or parking brake for operating regions in which no reliable statements are present as to the braking torque applied on the wheel.

It is especially advantageous that a clear standstill criterion can be given for the vehicle on the basis of the brake torque signal and this signal clearly differentiates from the standstill-like blocking of a wheel.

The actuation of the service brakes (similar to control operation) is maintained via the control of the brake actuation in the region of standstill of the vehicle in an advantageous manner.

It is especially advantageous that a so-called "stopping ABS" can be realized with the solution provided by the invention whereby the stopping operation is considerably improved.

A further advantage is afforded by the solution of the invention for the control of a parking brake which can be controlled adaptively in several operating situations and/or be controlled with respect to each wheel individually.

It is also advantageous to apply the solution of the invention for wheel brakes having electric braking forces (electric-motor brakes).

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
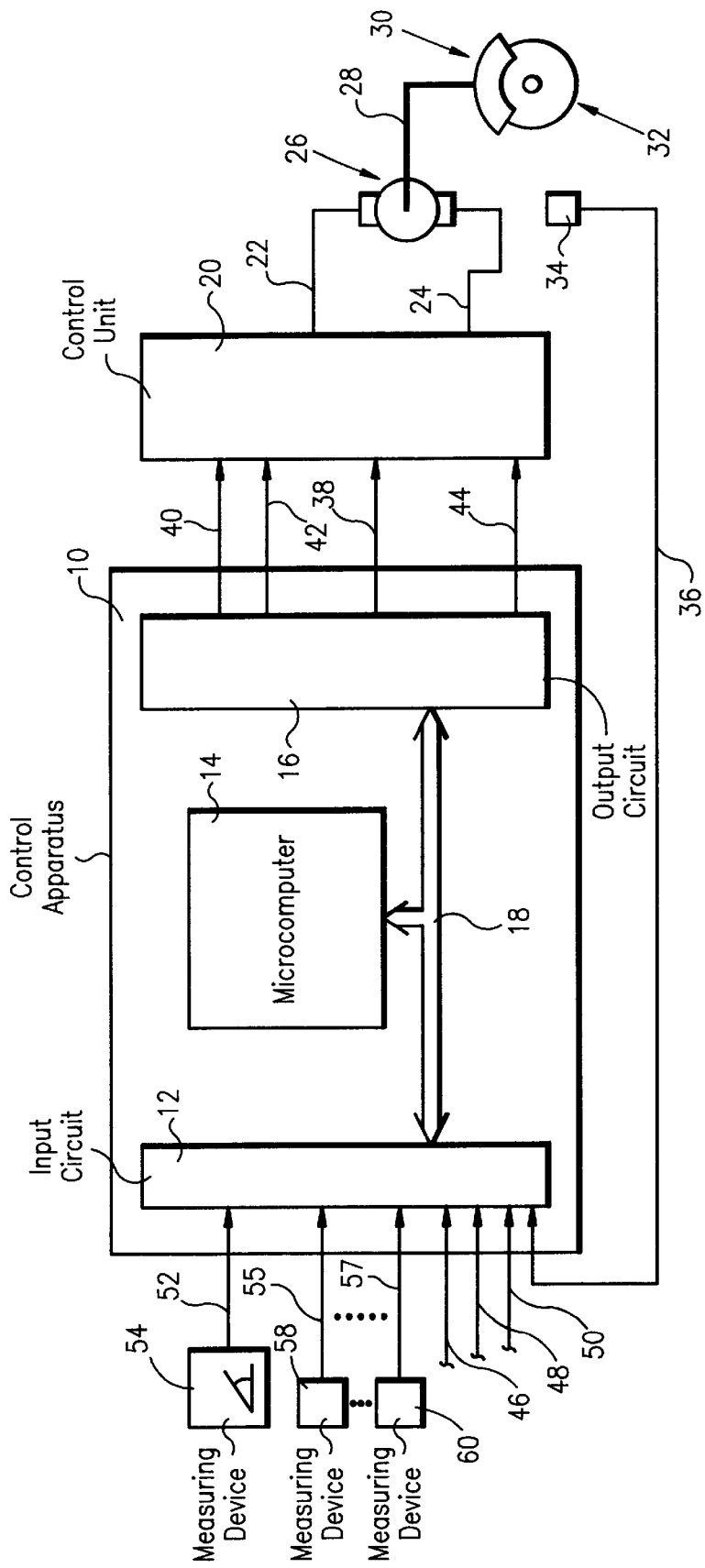
FIG. 1 is an overview block circuit diagram of a control arrangement in a preferred embodiment of a brake system having electric braking forces.

FIG. 1 shows an electronic control unit 10 having an input circuit 12, at least one microcomputer 14 and an output circuit 16. These components are connected to each other via a bus system 18 for data exchange. Further, a control unit 20 is shown and, in a preferred embodiment, this control unit actuates the electric actuators which preferably include DC motors. The actuators are connected to the wheel brakes of the motor vehicle. The electric motor 26 (DC motor) is connected via electric connecting lines 22 and 24 to the control unit 20, as shown exemplary for one wheel brake of the vehicle.

The electric motor 26 is connected via a mechanical connection 28 to the brake clamp 30 of the wheel 32. When the electric motor 26 is actuated, the brake clamp 30 of the wheel brake is opened or closed depending upon the direction of rotation of the motor. As a rule, the actuating device is guided into the proximity of its rest position when no current flows through the motor (opened brakes). Furthermore, the actuating device includes a controllable clutch which holds the brake shoes to the value adjusted by the electric motor in predetermined operating situations (for example, parking brake function) even when the clutch is not driven.

In the region of the actuating device, at least one sensor 34 is provided which supplies via a line 36 an actual value as to brake actuation to the control unit 10 (there, the input circuit). The sensor 34 can be a brake-force sensor, a brake torque sensor, a current sensor, et cetera. In the preferred embodiment, the sensor 34 detects the braking torque acting on the wheel 32.

In another embodiment, the braking torque is estimated, for example, from the braking force, mean friction radius and friction coefficients. The actuating device is actuated by the control apparatus 10 via an output line 38 extending from the output circuit 16.

In addition to the control of the wheel brake shown, the wheel brakes of the other vehicle wheels are controlled in a corresponding manner via output lines 40, 42 and 44. Additional input lines 46, 48 and 50 are connected to the input circuit 12. These input lines 46, 48 and 50 conduct the control actual values of the other wheel brakes to the control apparatus 10. In addition, at least one input line 52 leads to the control apparatus 10 from a measuring device 54 for detecting the brake-pedal actuation (for example, the pedal path, pedal force, et cetera). Input lines 55 to 57 lead to the control apparatus 10 from measuring devices 58 to 60, respectively. The measuring devices 58 to 60 detect additional operating variables necessary for controlling the brake system. These operating variables are, for example, wheel speeds, axle loads, yaw rates, et cetera.

In normal operation of the brake system, a desired value for the individual wheel brakes is derived by the control apparatus 10 (the microcomputer 14) from the degree of actuation of the brake pedal. This takes place, for example, by considering the axle loads in accordance with pregiven characteristic lines, characteristic fields, tables or computation steps. This desired value, which is derived from the degree of actuation, defines in the preferred embodiment a desired value for the brake torque to be applied. The desired value is corrected, as needed, in the context of an ABS and/or VDC control for each wheel individually in accordance with the wheel speeds, rates of yaw, et cetera. The abbreviation "VDC" is the abbreviation for "Vehicle Dynamics Control" and is explained, for example, in the article by A. T. van Zanten et al" entitled "VDC, the Vehicle Dynamics Control System of Bosch", SAE Paper No. 950759 (1995). The desired value for each wheel individually corrected in this manner is then compared for each wheel brake, to the actual value for the brake torque measured at the corresponding wheel and the difference in each case is supplied to the controller provided for the corresponding wheel. The controller forms, in accordance with the difference and a predetermined control strategy (for example, PID), a controller actuating quantity which is outputted via the output line to the control unit 20. There, the control quantity, which defines a current through the electric motor 26, is converted by actuating the actuating motor.

The described brake-torque control loops (for each wheel individually) are implemented in another embodiment in the control unit 20 which likewise includes at least one microcomputer for this case.

In the region of low wheel rpms, that is, in the region of standstill of the vehicle, no brake torque can be measured at least on a plane. For this reason, and for the control of an electrically controlled brake system on the basis of the detected brake torque, it is necessary in this operating region to find additional solutions in addition to the brake-torque control.

According to the invention, it is proposed to provide a transition from the closed-loop control to the open-loop control of the service brake in the region of very low wheel rpm and especially in the region of standstill of the vehicle. In this connection and as explained below, the actuating quantity for each wheel is adjusted in accordance with the desired value. With a change of the position of the brake pedal and for building up the braking force or reducing the braking force, the actuating quantity for all wheel brakes is synchronously changed and with approximately the same time-dependent trace. As a suitable criterion for limiting this control region, a trace of the brake torque signal is applied in the region of low road speed (when the road speed drops below a minimum value). With the transition to standstill, the brake pad moves from sliding friction into static friction. A static friction peak occurs thereby in the time-dependent trace of the brake torque.

In a further embodiment, the decay of the brake torque as a function of time can be applied as a criterion or a mix of both methods can serve as a criterion. The decay of the brake torque as a function of time is caused by the spring-damped suspension of the vehicle. Thus, standstill is, for example, detected when a static-friction peak and a brake-torque trace characterizing the decay thereof are present. When standstill is detected, there is a movement out of brake torque closed-loop control and the actuating variable for the brake actuators is formed in accordance with an open-loop control. A defective detection of standstill is avoided by applying the road speed as a further criterion.

The pulses in the area of the brake-torque signal, which arise when stopping the vehicle, can also be applied to improve the stopping operation. On a wheel, for which such a standstill criterion is detected, a switchover from closed-loop control to the open-loop control takes place and the brake is released in the context of the open-loop control. A renewed braking is initiated at a time point at which a pregiven number of wheels are detected to be at standstill in the context of the criterion. Two, three or four different wheels are applied to trigger the repeat braking.

A parking brake function is likewise realized in the context of the open-loop control at standstill of the vehicle. At standstill, it is possible that the vehicle can be loaded so that there is a change of the axle loads associated therewith. For this reason, the control value for the actuating variable in the case of the parking brake cannot be derived from the service brake desired value last measured effectively, especially, if the axle loads are not detected. Instead, in this case, a predetermined parking brake value must be controlled to which can be possibly less than a service brake value because of the static friction at the brake linings. If the vehicle is at an incline, then a parking brake torque can be measured. An increase of the value of the actuating variable for each wheel individually (adaptive parking brake) can be made in dependence upon the value of this parking brake torque in one embodiment. The adaptive parking brake affords advantages especially in combination with a two-value actuating device via an appropriate braking force at limited energy consumption. A use of the adaptive parking brake for the case of a metered actuating device would be connected with a detection of standstill.

The solution according to the invention is shown in the preferred embodiment of a wheel brake with an electric braking force. The invention can be utilized with the above-mentioned advantages also with a braking system equipped with hydraulic or pneumatic actuators for the wheels brakes. Here, a variable is used as a controller actuating variable or control actuating variable with which the valve devices are actuated for controlling the pressure in the wheel brake cylinders. In accordance with the procedure of the invention, this variable is formed in the context of a closed-loop control and in special operating situations, in the context of an open-loop control.

Figure 2:
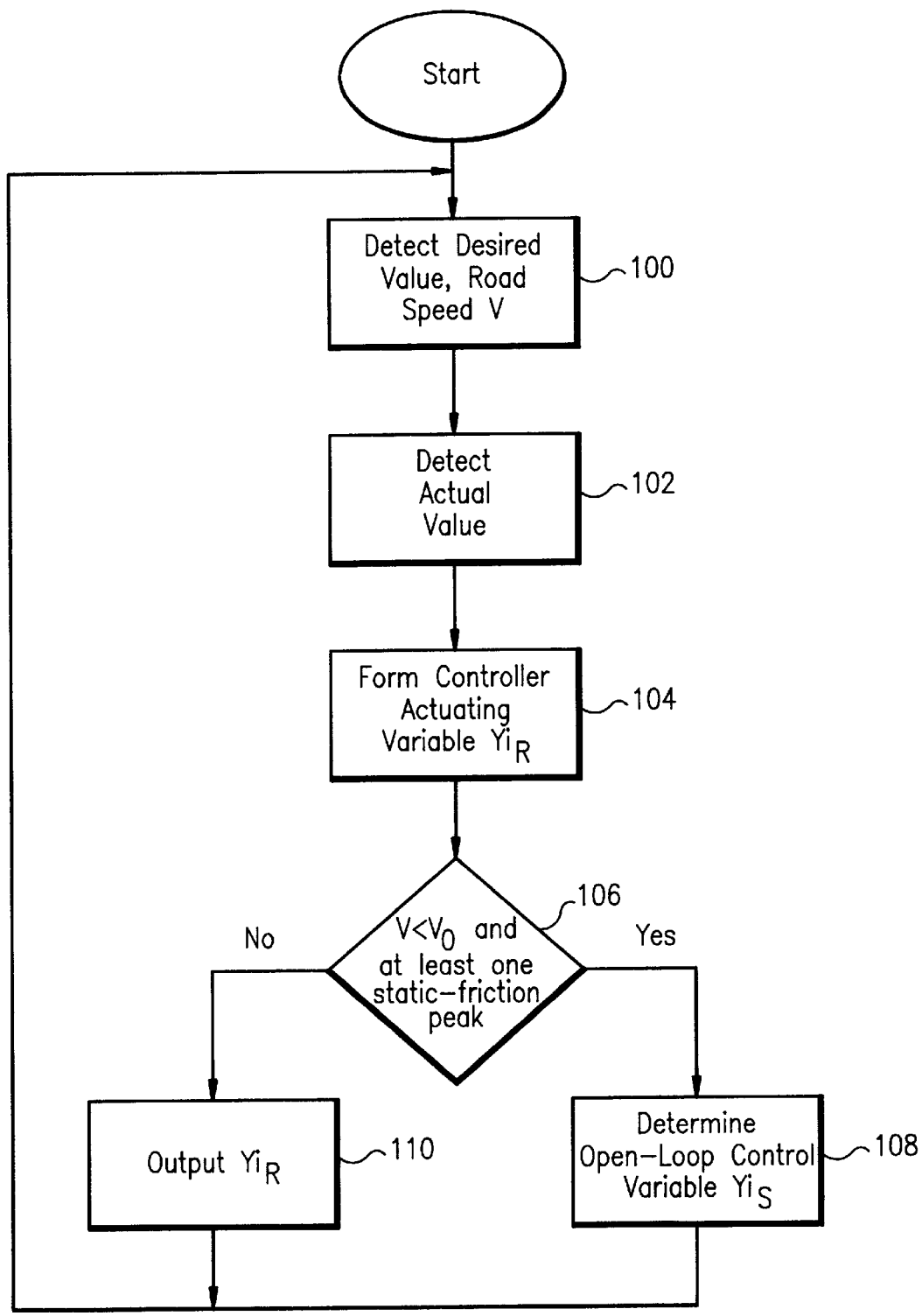
FIG. 2 shows, in the context of a flowchart, a procedure for actuating the wheel brakes having electric braking forces for the preferred embodiment of the invention and shows the procedure within and outside of the region of motor vehicle standstill.

A realization of the closed-loop control and of the transition to open-loop control is shown in FIG. 2 with respect to a flowchart. The subprogram described there is run through for each wheel brake individually at pregiven time points with the actuation of the brake pedal. In FIG. 2, a selected wheel brake is viewed. Corresponding subprograms are provided for the other wheel brakes. In a first step 100, the desired value, which is derived from the pedal actuation, is detected for the selected wheel brake as is the road speed V. Thereafter, in step 102, the actual value of the selected brake is detected. In the next step 104, the controller actuating variable $Yi_R$ for the selected wheel brake is formed in accordance with a pregiven control strategy on the basis of the desired value and actual value (corrected, if required, via additional functions such as ABS, VDC, et cetera). The standstill criterion is checked in the next inquiry step 106. In one embodiment, this check is performed by evaluating corresponding marks. These marks are set when, at a selected wheel brake, there is a drop of the speed below a threshold value and when a static-friction peak occurs in the brake torque signal and/or a decay in the brake torque as a function of time. If the standstill criterion is satisfied, then, in step 108, the open-loop control is initiated. If the standstill criterion is not satisfied, then in accordance with step 110, the controller actuating variable $Yi_R$, which is determined in step 104, is outputted. Thereafter, the subprogram is repeated with step 100 at a pregiven time.

A preferred embodiment of the control 108 will now be described.

The control variable $Yi_S$ for the wheel brake is determined on the basis of the detected desired value as well as a pregiven time function T which is essentially the same for all wheel brakes. The time function leads to the change of the control variable when there is a change of the desired value. The time function ensures a brake force reduction (or the brake force buildup) which takes place at all braked wheel brakes essentially in synchronism and in essentially the same time-dependent trace or curve. For the determination of the control variable on the basis of the desired value, a pregiven characteristic line, a pregiven characteristic field, a pregiven table or suitable computation steps are provided. The control variable is stored in the pregiven characteristic line in dependence upon the desired value and, if required, the axle loads. The allocation is determined experimentally so that, at each wheel brake, approximately the same brake force, brake torque or the same current results. The control variable is changed from the old value to the new value in the context of the pregiven time function if a difference between the desired value is determined from one of the pregiven program runthroughs and the actual desired value. The computed control variable is then outputted to the brake actuator device.

In FIG. 3, the operation of the procedure shown in FIG. 2 is presented in the context of quantities plotted as a function of time. Thus, FIG. 3*a* shows the time-dependent trace of the desired value and FIG. 3*b* shows the brake torque as a function of time at a selected wheel. FIG. 3*c* shows the trace of the controller actuating variable at this wheel and FIG. 3*d* shows the trace of the control actuating variable at this wheel.

Figure 3A:
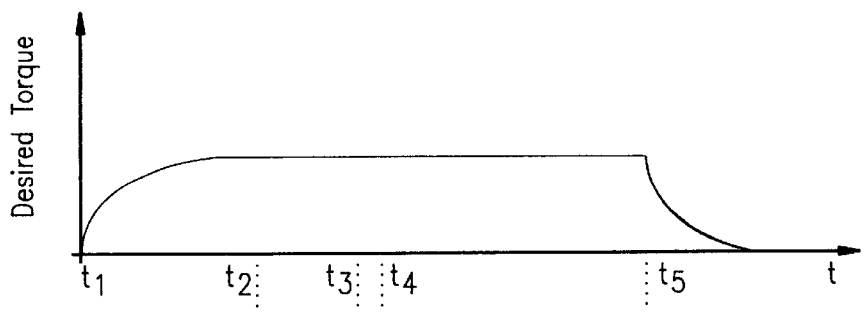
FIGS. 3a to 3d show plots of respective quantities plotted as a function of time which show the operation of the embodiment of FIG. 2 in a selected operating situation.
Figure 3B:
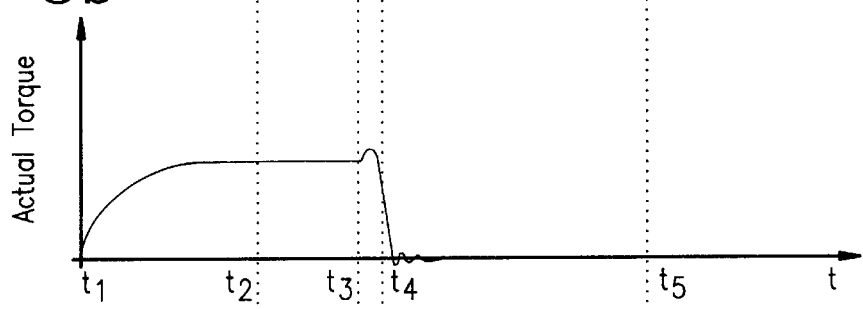
Figure 3C:
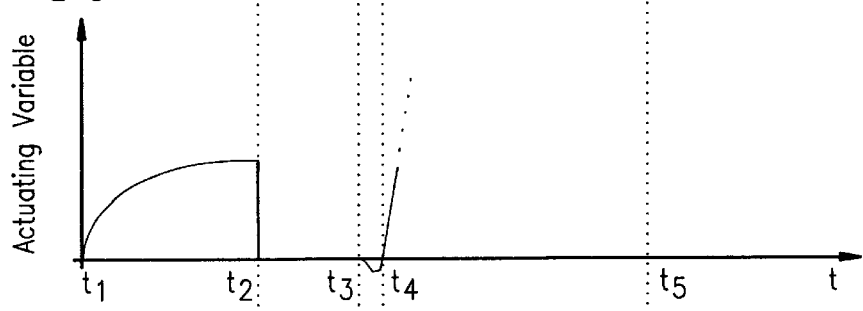
Figure 3D:
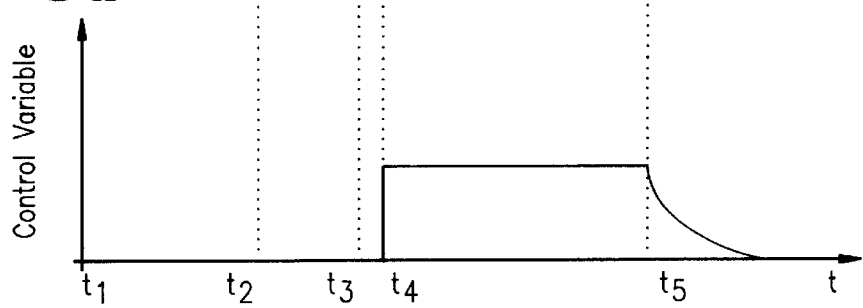
Figure 4A:
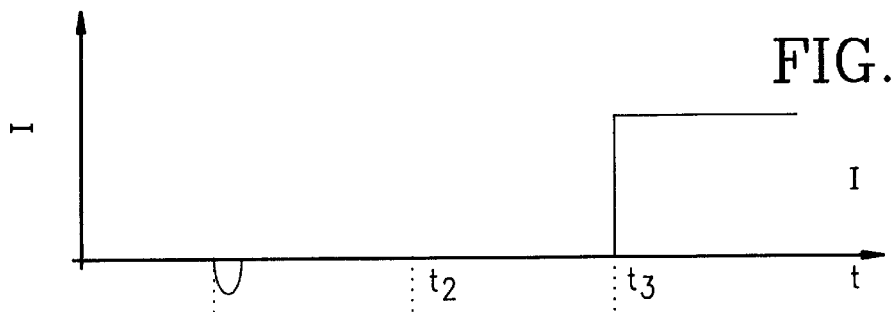
FIGS. 4a to 4e show respective quantities plotted as a function of time and present the operation of a "stopping-ABS"; and, FIG. 5 is a flowchart showing a realization of a parking brake control as a computer program.
Figure 4B:
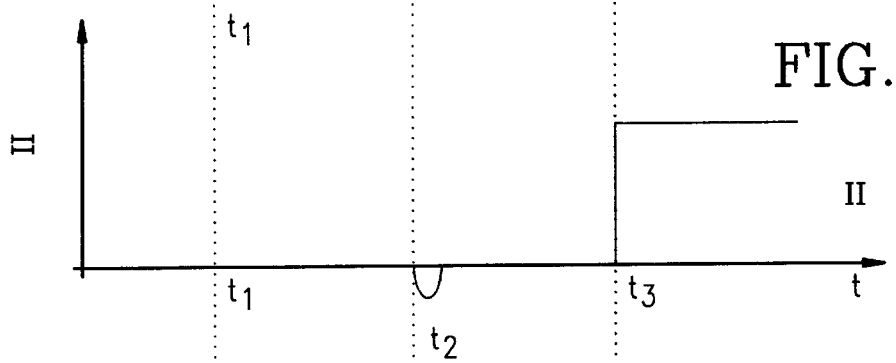
Figure 4C:
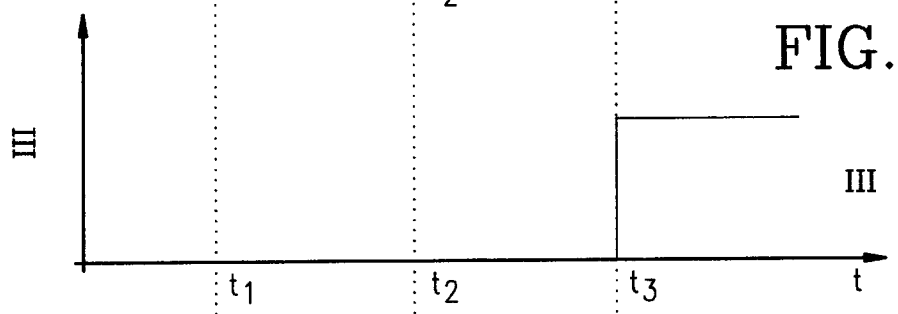
Figure 4D:
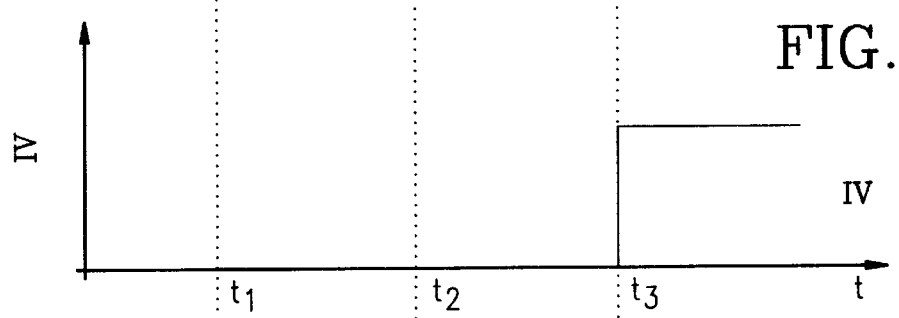
Figure 4E:
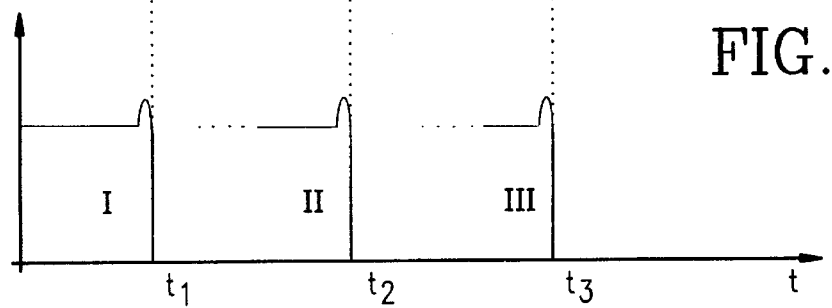

The driver actuates the brake pedal from time point $t_1$ on in order to brake the vehicle. Correspondingly, a brake torque in accordance with FIG. 3*b* is built up at the wheels because of a corresponding course of the controller actuating variable (FIG. 3*c*). This brake torque is built up in the context of the brake torque control. From time point $t_2$, the driver holds the brake pedal in a constant position so that the controller actuating variable is interrupted starting at time point $t_2$ and the built up brake torque is maintained in the actuator by closing the clutch. Between time points $t_2$ and $t_3$, control interventions can take place for changes of the desired value and these interventions build up or reduce the brake force. At time point $t_3$, the wheel speed drops toward 0 so that a peak in the trace of the torque is detected. This trace of the brake torque is brought about because, at this time point, the friction between the brake disc and the brake lining goes from a sliding friction to a static friction. In this way, the brake torque at this wheel is measurably increased. Because of the increased actual value, the controller is compelled to reduce braking force. A negative controller actuating variable between time points $t_3$ and $t_4$ is the result. The brake torque can no longer be measured after standstill of the wheel so that, pursuant to FIG. 3*b*, no signal is any longer present which can be evaluated.

The drop below the rpm threshold and the friction peak of the brake torque signal are evaluated as standstill criteria so that, after the time point $t_4$, the standstill of the vehicle is detected and a switchover to open-loop control takes place. In the region of time point $t_4$, a control actuating variable is therefore pregiven which is maintained in correspondence to the desired value up to the time point $t_5$. In this way, the brake force built up at the wheel is maintained. Between the time points $t_5$ and $t_6$, the driver releases the pedal so that the control actuating variable is correspondingly decontrolled. This decontrol takes place at all wheel brakes essentially in synchronism and with a similar time-dependent trace. Between the time points $t_3$ and $t_4$, fluctuations of the torque value about the zero point can take place as a consequence of the decay of oscillation of the vehicle suspension. This signal too can be applied as an alternative or as supplementary to the static friction peak for detecting standstill.

In a further embodiment, and in the context of the open-loop control, a so-called stopping ABS is realized in the region of low wheel rpms. This stopping ABS avoids an uncontrolled blocking of the wheels in the region of the lowest speeds. As a standstill criterion and therefore as the basis for the transition to open-loop control, in this case, and in accordance with step 106, the presence of static-friction peaks of the brake torque signals are evaluated from two, three or four wheels in addition to the road speed threshold. This leads to the situation that, based on the control function, the brakes are initially released at the first wheels moving into standstill. If the standstill criterion is satisfied, then, at wheels with released brakes, braking force is built up synchronously in the context of the open-loop control and, at the other wheels, the controller actuating variable is replaced (if needed while increasing the braking force) by the corresponding control actuating variable.

For the synchronous braking, the standstill criterion for two, three or four wheels must be satisfied dependent upon the embodiment.

The above solution is made clear in FIGS. 4*a* to 4*e* with the aid of quantities plotted as a function of time. Thus, in FIGS. 4*a* to 4*d*, the control variable $Yi_S$ is plotted as a function of time for the four wheel brakes of the vehicle; whereas, in FIG. 4*e*, the trace of the brake torque signal for three selected wheels of the vehicle are shown.

All brakes are in closed-loop control operation before time point $t_1$. At time point $t_1$, the standstill criterion for the first wheel I is satisfied (see FIG. 4*e*). In accordance with FIG. 4*a*, this leads to a corresponding drive (which releases the brake) in the context of the open-loop control of the brake assigned to this wheel. At time point $t_2$ (see FIG. 4*e*), the standstill criterion for a second wheel II is detected as satisfied. Accordingly, and in accordance with FIG. 4*b*, this brake is released at time point $t_2$. At time point $t_3$, the standstill criterion is satisfied for a third wheel III. According to FIGS. 4*a* to 4*d*, this leads to the synchronous buildup of the braking force at the wheels I and II (see FIGS. 4*a* and 4*b*) in the context of the open-loop control; whereas, for the wheels III and IV, the braking force, which is obtained from the closed-loop control operation, is maintained by corresponding control actuating variables. The fourth wheel IV (standstill criterion has up to now not been satisfied) is braked, if needed, with great intensity.

At standstill of the vehicle, a parking-brake function is realized by the open-loop control of the brake system. This is initiated when the driver actuates a corresponding operator-controlled element (hand brake lever, foot brake, switch element, et cetera) to activate the parking brake.

Figure 5:
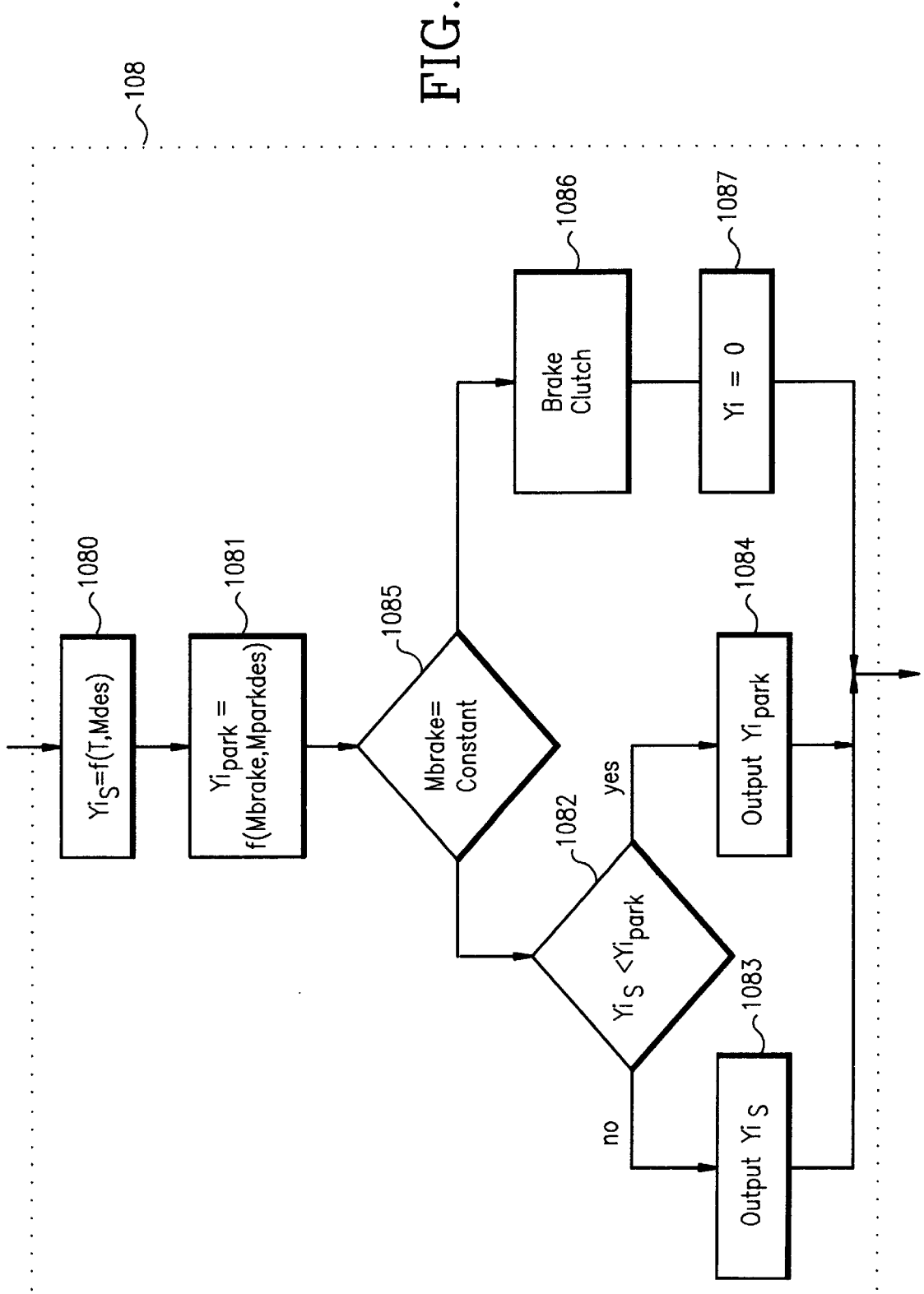

A preferred embodiment is described as a program of a microcomputer in the flowchart of FIG. 5. FIG. 5 is a detailed view of the open-loop control of step 108 of FIG. 2.

In the first step 1080, the control actuating variable $Yi_S$ of the selected wheel brake is computed from the desired torque of the brake pedal Mdes and, if required, from a pregiven time function T. In the next step 1081, the control actuating variable $Yi_{park}$ is determined for the parking brake.

During standstill, it is possible that the axle loads change because of loading. For this reason, this control actuating variable in the case of the parking brake cannot be derived from the operating brake desired value Mdes which was last effectively measured. In addition, if an actual torque Mbrake greater than zero is measured, this indicates that the vehicle is on an incline at standstill. The gravity drive force on the incline is to be countered by means of an increased control voltage. For this reason, in step 1081, the control variable of the parking brake is computed in dependence upon the desired value Mparkdes of the parking brake actuating device and from the measured actual torque (Mbrake). This was described above as adaptive parking brake. In the next step 1085, a check is made as to whether the actual braking torque is constant. This is only the case (caused by the drive $Yi_{park}$ which changes), when the vehicle is standing still. If this is not the case, then, in step 1082, the drive quantities computed in steps 1080 and 1081 are compared to each other. The brake actuator is driven by the larger of the two control actuating quantities in accordance with steps 1083 or 1084. If no brake torque change can any longer be determined (step 1085), then the clutch of the brake actuator is driven in accordance with steps 1086 and 1087 in the sense of closing and maintaining the braking force and the control actuating variables are set to zero. With a renewed actuation of the parking brake actuating device (release), the clutch is opened and the vehicle is released.

It is understood that the foregoing description is that of the preferred embodiments of the invention and that various changes and modifications may be made thereto without departing from the spirit and scope of the invention as defined in the appended claims.

What is claimed is:

1. A method for controlling a brake system of a motor vehicle driven by an operator, the brake system including at least one wheel brake apparatus including an actuable brake actuator, the method comprising the steps of:

actuating said brake actuator in the context of a closed-loop control in dependence upon a desired value pregiven by the operator; and, switching from said closed-loop control to an open-loop control of said brake actuator in at least one operating region of said vehicle in dependence upon said desired value.

2. The method of claim 1, wherein said operating region is defined by a low rpm of the wheels of said vehicle.

3. The method of claim 1, wherein said closed-loop control is a brake-torque closed-loop control, the method comprising the further steps of:

detecting the actual brake torque occurring at the wheel corresponding to said brake actuator;

providing a desired brake torque pregiven by at least one of the operator and an ancillary function including one of ABS and VDC; and, bringing said actual brake torque into relationship with said desired brake torque to form a drive signal for said brake actuator.

4. The method of claim 3, wherein said operating region is defined as an operating region wherein said actual brake torque occurring at said wheel can no longer be reliably detected.

5. The method of claim 4, comprising the further step of deeming said one operating region as being arrived at when the road speed of said vehicle has dropped below a predetermined limit value and the brake torque signal for at least one of the wheels of said vehicle exhibits a static friction peak.

6. The method of claim 3, comprising the further step of forming a control variable in the context of said open-loop control of said brake actuator in dependence upon said desired value pregiven essentially by said operator.

7. The method of claim 3, wherein the change of the brake force applied at said wheel takes place at the other wheels of said vehicle essentially in synchronism and with a similar time-dependent trace in response to a change of said desired value pregiven by said operator.

8. The method of claim 3, further comprising the step of switching over to said open-loop control when the road speed of said vehicle drops below a predetermined limit value and the brake torque signal for a pregiven number of the wheels of said vehicle exhibits a static-friction peak.

9. The method of claim 3, wherein said brake actuator is an electric brake actuator; and, wherein said method comprises the further steps of:

detecting standstill of said vehicle; and, when said standstill is determined, forming a predetermined control value to establish a park brake function.

10. The method of claim 9, wherein said control value is essentially only dependent from said desired value input of the accelerator pedal or is computed as adaptive park brake from said desired value input and additional signals.

11. The method of claim 3, wherein said brake system is a brake system having electric braking force and said brake actuator includes an electric motor.

12. An arrangement for controlling a brake system of a vehicle, the brake system including an electrically actuable actuator of a wheel brake, the arrangement comprising:

an electronic control unit for controlling said electrically actuable brake actuator in the context of a closed-loop control in dependence upon a desired value pregiven essentially by the operator of said vehicle; and, said electronic control unit including means for controlling said brake actuator in the context of an open-loop control in dependence upon said desired value when at least one pregiven operating region of said vehicle is reached.

13. The arrangement of claim 12, wherein said operating region is defined by a low rpm of the wheels of said vehicle.

14. An arrangement for controlling a brake system of a vehicle, the brake system including an electrically actuable actuator of a wheel brake, the arrangement comprising:

an electronic control unit for controlling said electrically actuable brake actuator in the context of a closed-loop control in dependence upon a desired value pregiven essentially by the operator of said vehicle;

means for detecting when said vehicle is at standstill; and, said electronic control unit including means for driving said brake actuator with a predetermined control value when said standstill of said vehicle is detected to produce a park brake function.

* * * * *